May 5, 1936. H. H. ROBINSON 2,039,452
TANK TRAILER
Filed June 18, 1934 3 Sheets-Sheet 1
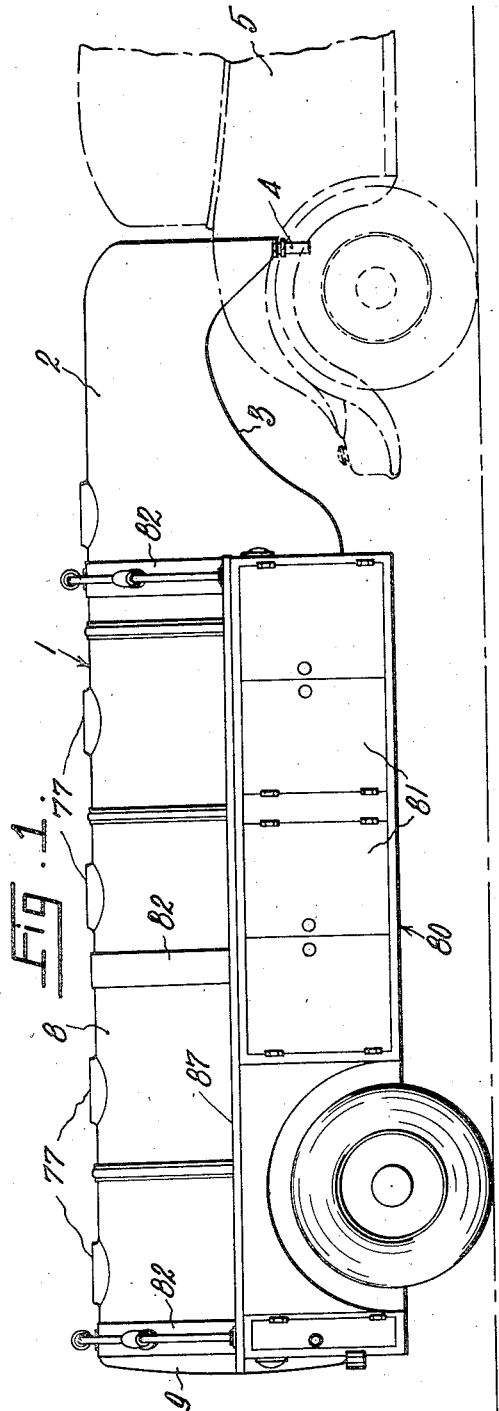
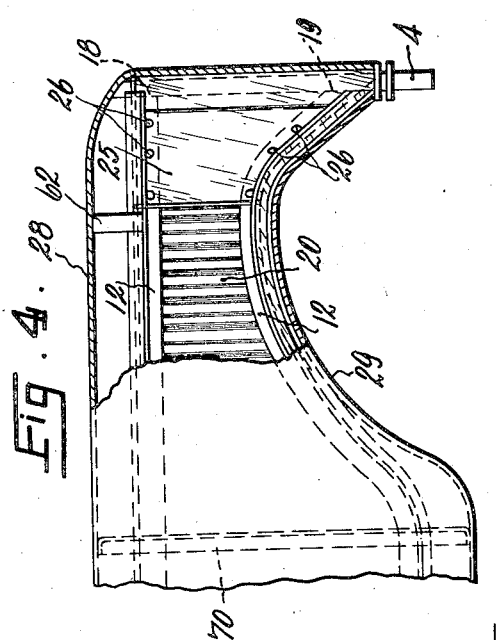
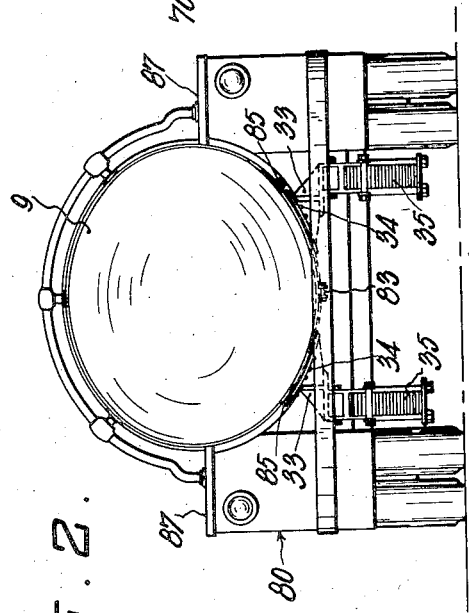
INVENTOR
HAROLD H. ROBINSON
BY Chapin & Neal
ATTORNEYS May 5, 1936.  H. H. ROBINSON  2,039,452
TANK TRAILER
Filed June 18, 1934  3 Sheets-Sheet 2
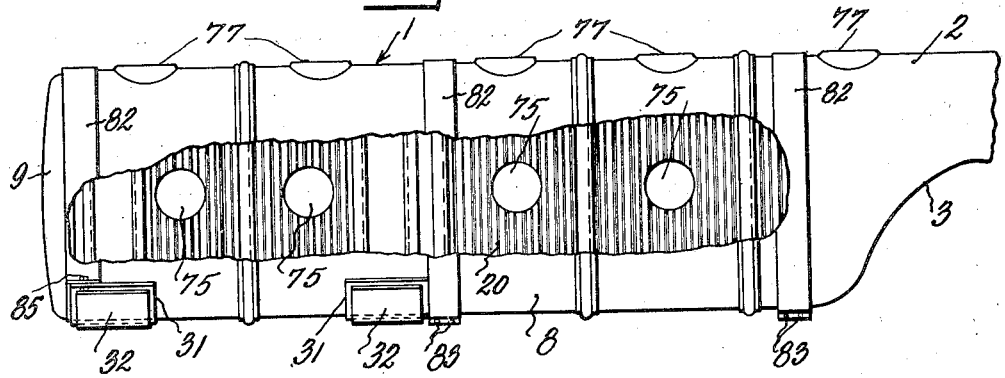
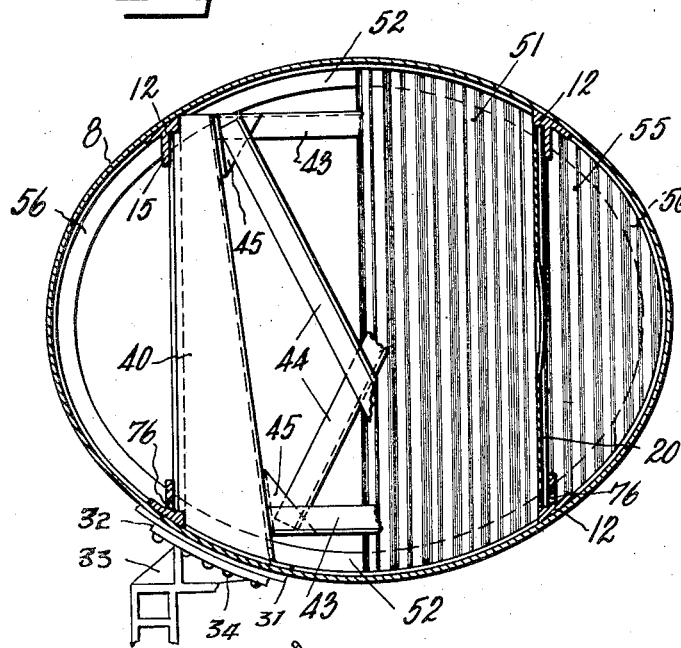
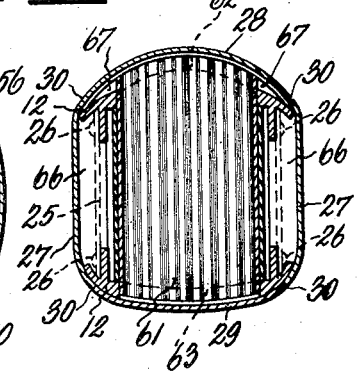
INVENTOR
HAROLD H. ROBINSON
BY  Chapin & Neal
ATTORNEYS May 5, 1936.   H. H. ROBINSON   2,039,452
TANK TRAILER
Filed June 18, 1934   3 Sheets-Sheet 3
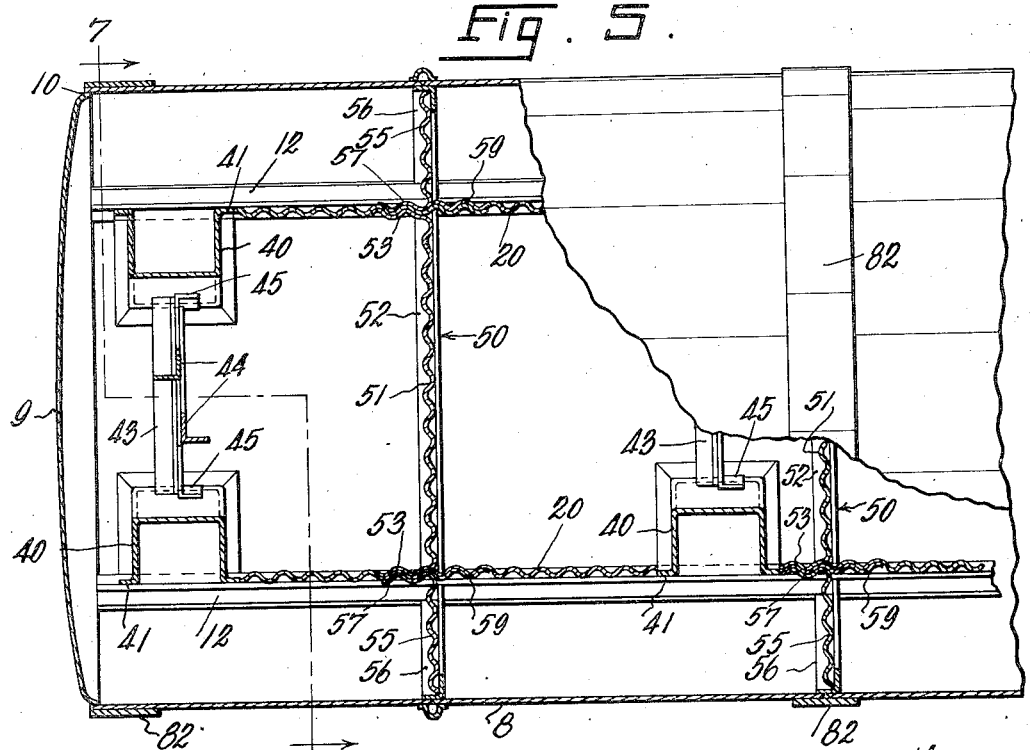
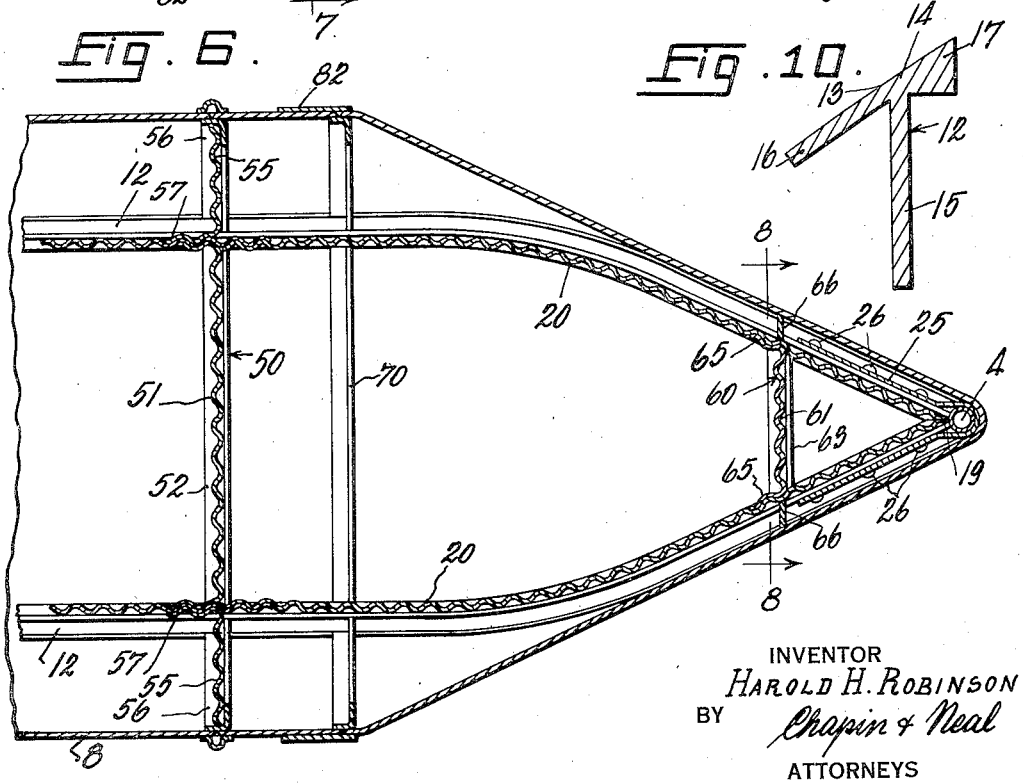
INVENTOR
HAROLD H. ROBINSON
BY  Chapin & Neal
ATTORNEYS Patented May 5, 1936

2,039,452

UNITED STATES PATENT OFFICE 2,039,452

TANK TRAILER

Harold H. Robinson, Coral Gables, Fla., assignor to Curtiss Aerocar Company, Inc., Coral Gables, Fla., a corporation of Florida Application June 18, 1934, Serial No. 731,046

5 Claims. (Cl. 280—5)

This invention relates to tank trailer vehicles and more particularly to an internal frame structure for such vehicles constructed and arranged to act and serve both as a tank strengthening frame and as a chassis frame so that no exterior chassis frame is necessary.

One object of the invention is to provide a construction and arrangement of parts which will permit the maximum use of light materials such as aluminum or its alloys without sacrifice of strength and with a substantial decrease in weight. A further object is to provide a frame, the members of which are so arranged that the wheels of the trailer may be positioned to so distribute the weight between the trailer wheels and the coupling pin at the nose as to increase the traction and braking effort of the rear wheels of the tow car. Other and further objects will be apparent from the following specification and claims.

In the accompanying drawings which illustrate one embodiment of the invention,

Fig. 1 is a side elevation of a tank vehicle according to the invention, a portion of the tow car being shown in dotted lines;

Fig. 2 is a rear end elevation of the vehicle shown in Fig. 1;

Fig. 3 is a side elevation of the tank, parts being broken away;

Fig. 4 is a side elevation of the prow portion on a larger scale, parts being broken away;

Fig. 5 is a plan view on a larger scale of the rear portion of the tank, parts being in section;

Fig. 6 is a similar view in section of the prow portion of the tank;

Fig. 7 is a section substantially on line 7—7 of Fig. 5, parts being broken away;

Fig. 8 is a section substantially on line 8—8 of Fig. 6;

Fig. 9 is a detail view showing the manner of connecting the side plates and bulkheads; and Fig. 10 shows a transverse section of one of the longitudinal members.

Referring to the drawings, 1 indicates the tank structure as a whole, the forward portion 2 being converged to form a prow. The lower side of the prow portion 2 is curved upwardly as at 3 and the prow is provided at its extreme forward end with a coupling pin 4 by means of which the trailer is coupled to a tow car indicated in dotted lines at 5.

The tank structure comprises a frame enclosed by a wrapper sheet or shell 8. The tank as shown is elliptical in cross section and the rear end is closed by a head 9 welded to the edge of the wrapper sheet at 10. The frame includes four rectangularly spaced longitudinal members 12 formed of aluminum, which extend the full length of the trailer. The preferred cross section of the members 12 is generally T-shaped and as best shown in Fig. 10 the outer surface 13 of the head portion 14 is curved to conform to the curvature of the wrapper sheet to which they are directly welded. The members 12 are arranged relatively to each other as shown in Fig. 7, the web portions 15 being vertical. The flanges of heads 14 are not symmetrical, one flange 16 being relatively long and thin while the flange 17 is thick and short and forms a shoulder or abutment to which the edges of vertical plates 20 are welded. Plates 20 are formed of aluminum and are vertically corrugated. At the nose portion of the trailer the upper pair of members 12 are converged together in their original horizontal plane to a mitered welded joint 18 adjacent the upper end of pin 4. The lower pair of members 12 are curved both upwardly and toward each other and then downwardly, as shown in Fig. 4, to a similar mitered and welded joint 19 adjacent the lower end of pin 4. The vertical position of the web portions 15 of the members 12 are maintained in a vertical position throughout the length of the members and side plates 20 are bent and shaped in the nose portion in conformity with the members 12 to which they are welded.

The coupling pin is preferably of steel and is jointed to the tank frame by a plate 25 bent around and welded to the pin and riveted at 26 (see Figs. 4, 6 and 8) to the vertical webs of members 12. The wrapper 8 at the prow portion is formed by two side sheets 27 and top and bottom sheets 28 and 29 welded together at 30, the flanges 16 of members 12 being bent to conform to the increasing curvature of the wrapper sheets.

Wheel mountings are secured to the outside of the tank shell by means of metal pads 31 and 32 and brackets 33 riveted to the tank as at 34. Springs 35 are connected by suitable shackles to the brackets 33 and the wheel axle is secured to the springs substantially as shown in prior copending application Serial No. 679,883, filed July 11, 1933, or in any other suitable manner. By connecting the springs to brackets secured directly to the tank, without the intervention of any framework the center of gravity is materially lowered, the tank extending downwardly between the wheels 35 as best shown in Fig. 2.

Inside of the tank the frame is provided with special bracing means, positioned directly over the pads 31—32, by which the load and draft strains are transmitted and distributed to the frame members. The bracing structure comprises four columns 40, one over each pad assembly 31—32. These columns as best shown in Figs. 5 and 7 are in the form of channels with their open sides facing outwardly. The vertical edges are provided with flanges 41 to which the ends of the plate members are welded. The closed sides of the columns are inclined to increase the width of the columns at the base. The opposing columns are connected by horizontal bracing members 43 and diagonal members 44 welded to flanged gusset plates 45 which are welded to the inner faces of the columns.

The tank is preferably divided into compartments by transverse bulkheads or partitions 50 formed of vertically corrugated aluminum plates similar to plates 20. These bulkheads are all similar in structure, with the exception of the foremost bulkhead which is later described, and are constructed in three pieces. The central piece 51 is fitted between the vertical plates 20 and is welded at top and bottom to curved angle supports 52 which are welded to the tank shell 8. The sides of the central pieces 51 are bent at right angles, as at 53 in Figs. 5 and 9, and welded to the plates 20. Similarly side pieces 55 close the spaces between the plates 20 and the sides of the tank, the outer curved edges being welded to curved angle members 56 which are welded to the shell while the inner vertical edges are bent at right angles as at 57 and welded to the plates 20. The plates 20 may be continuous from end to end of the tank but fabrication is facilitated by making them in sections and connecting the sections by overlapping and welding adjacent the bulkheads as indicated at 59, Fig. 9.

The forward compartment preferably includes a portion of the prow portion 2 and terminates at a bulkhead 60 positioned adjacent the rear ends of plate 25, see Figs. 6 and 8. This bulkhead comprises a central portion 61 welded at top and bottom to curved angle members 62 and 63 which are welded respectively to sheets 28 and 29, and at the sides to plates 20 as at 65, Fig. 6. The spaces between the plates 20 and sheets 27 are filled by fitted plates 66 welded in place and the small openings above the upper members 12 are closed by the portions 67 of the angle member 62. At the point where the elliptical shape of the main body ends and the prow portion begins to converge, curved angle supports 70 are welded to the shell 8 and the members 12 to stiffen the structure at that point.

Free flow of liquid within the compartments is assured by suitable openings 75 formed in plates 20 and drain holes 76 positioned as required in the webs of lower members 12 and the base of columns 40. Inlet openings 77, provided with suitable closures not shown, are provided for each tank compartment and any suitable discharge piping, not shown, is provided for discharging the contents of the tank. Housings 80 of any desired form may be secured in position at the sides of the tank. As shown the housing comprises general utility cupboards 81 which are welded or otherwise secured to bands 82 which encircle the tank and are held in position by bolts 83 connecting their ends beneath the tank with the exception of the rearmost band, the ends of which are releasably secured by bolts 85 to outwardly extending flanges formed on the rear pads 31. By loosening the bolts 83 and 85 to disconnect the ends of bands 82, the bands and housing structure may be removed bodily from the tank. The top 87 of the housing structure provides a running board, facilitating access to the tank through openings 77.

I claim:

1. A semi-trailer tank vehicle which comprises, a tank shell elliptical in cross section, pairs of spaced spring mountings secured to the outside of the shell at opposite sides of the tank adjacent the rear end thereof, a combined tank and chassis frame enclosed within the tank shell, said frame comprising four vertical columns positioned one over each spring mounting, the ends of said columns being connected to the inside of the tank shell, diagonally arranged cross bracing members connecting the transversely opposite pairs of columns, and four rectangularly spaced longitudinal members connecting the longitudinally opposite pairs of columns adjacent their upper and lower ends and extending from end to end of the tank, the forward ends of the longitudinal members being converged toward and connected to a prow post.

2. A semi-trailer tank vehicle which comprises, a tank shell elliptical in cross section, pairs of spaced spring mountings secured to the outside of the shell at opposite sides of the tank adjacent the rear end thereof, a combined tank and chassis frame enclosed within the tank shell, said frame comprising four vertical columns positioned one over each spring mounting, the ends of said columns being connected to the inside of the tank shell, diagonally arranged cross bracing members connecting the transversely opposite pairs of columns, four rectangularly spaced longitudinal members connecting the longitudinally opposite pairs of columns adjacent their upper and lower ends and extending from end to end of the tank, the forward ends of the longitudinal members being converged toward and connected to a prow post, and vertically corrugated plates connecting the vertically opposite pairs of longitudinal members.

3. A semi-trailer tank vehicle which comprises, a tank shell, pairs of spaced spring mountings secured to the outside of the shell at opposite sides of the tank adjacent the rear end thereof, a combined tank and chassis frame enclosed within the tank shell, said frame comprising four vertical columns positioned one over each spring mounting, cross bracing members connecting the transversely opposite pairs of columns, and four rectangularly spaced longitudinal members, T-shaped in cross section, connecting the longitudinally opposite pairs of columns adjacent their upper and lower ends and extending from end to end of the tank, the forward ends of the longitudinal members being converged toward and connected to a prow post, the heads of said longitudinal members being welded to the inner surface of the tank shell.

4. A semi-trailer tank vehicle which comprises, a tank shell, pairs of spaced spring mountings secured to the outside of the shell at opposite sides of the tank adjacent the rear end thereof, a combined tank and chassis frame enclosed within the tank shell, said frame comprising four vertical columns positioned one over each spring mounting, cross bracing members connecting the transversely opposite pairs of columns, and four rectangularly spaced longitudinal members, T-shaped in cross section, connecting the longitudinally opposite pairs of columns adjacent their upper and lower ends and extending from end to end of the tank, the forward ends of the longitudinal members being converged toward and connected to a prow post, the heads of said longitudinal members being welded to the inner surface of the tank shell, the webs of said longitudinal members being vertically positioned and connected by vertically corrugated plates.

5. A semi-trailer tank vehicle which comprises a tank shell, two spaced vertical plates extending substantially the length of the tank and connected along their top and bottom edges to the inner surface of the tank shell by longitudinally extending members, T-shaped in cross section, the forward ends of said longitudinal members being converged and connected to a coupling post, and transverse bulkheads dividing the tank into a plurality of compartments.

HAROLD H. ROBINSON.